(12) United States Patent
Honda et al.

(10) Patent No.: US 11,886,897 B2
(45) Date of Patent: Jan. 30, 2024

(54) PERSONAL DIGITAL ASSISTANT AND INSPECTION SUPPORT SYSTEM

(71) Applicant: MITSUBISHI HEAVY INDUSTRIES, LTD., Tokyo (JP)

(72) Inventors: Masaki Honda, Tokyo (JP); Gen Sakashita, Tokyo (JP); Tomohiro Higuchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/969,214

(22) Filed: Oct. 19, 2022

(65) Prior Publication Data

US 2023/0132587 A1 May 4, 2023

(30) Foreign Application Priority Data

Oct. 28, 2021 (JP) ................................. 2021-176909

(51) Int. Cl.
*G06F 9/451* (2018.01)

(52) U.S. Cl.
CPC .................................. *G06F 9/453* (2018.02)

(58) Field of Classification Search
CPC .................................................. G06F 11/0751
See application file for complete search history.

(56) References Cited

U.S. PATENT DOCUMENTS

| | | | | |
|---|---|---|---|---|
| 2010/0218030 A1* | 8/2010 | Bhatnagar | ........... | G06F 11/0706 714/39 |
| 2014/0154648 A1* | 6/2014 | Gonsalves | .......... | G06F 11/0742 709/217 |
| 2014/0310222 A1* | 10/2014 | Davlos | ................ | G06F 11/2294 706/46 |
| 2017/0286199 A1* | 10/2017 | Soini | .......................... | G06F 9/44 |
| 2021/0174615 A1* | 6/2021 | Iijima | ..................... | G08G 1/145 |
| 2021/0248897 A1* | 8/2021 | Jonsson | ................. | G08B 21/18 |
| 2022/0050765 A1* | 2/2022 | Pan | .......................... | G06F 40/30 |
| 2023/0096271 A1* | 3/2023 | Chambers | ........... | G06F 11/0793 714/46 |

FOREIGN PATENT DOCUMENTS

| | | |
|---|---|---|
| JP | 10-187229 A | 7/1998 |
| JP | 2008-304997 A | 12/2008 |
| JP | 2019-49778 A | 3/2019 |
| JP | 2020-201764 A | 12/2020 |

* cited by examiner

*Primary Examiner* — Di Xiao
(74) *Attorney, Agent, or Firm* — BIRCH, STEWART, KOLASCH & BIRCH, LLP

(57) ABSTRACT

A personal digital assistant for supporting inspection of at least one device disposed in an inspection target area includes: an abnormality acquisition unit configured to acquire information about an abnormality in the at least one device; a guidance information storage unit configured to store guidance information which at least includes at least one response procedure for each abnormal event in the at least one device and information about response capability required to execute the at least one response procedure; and a display unit configured to refer to the guidance information stored in the guidance information storage unit, and display the guidance information for responding to an abnormal device which is the device where the abnormality is acquired by the abnormality acquisition unit.

11 Claims, 10 Drawing Sheets

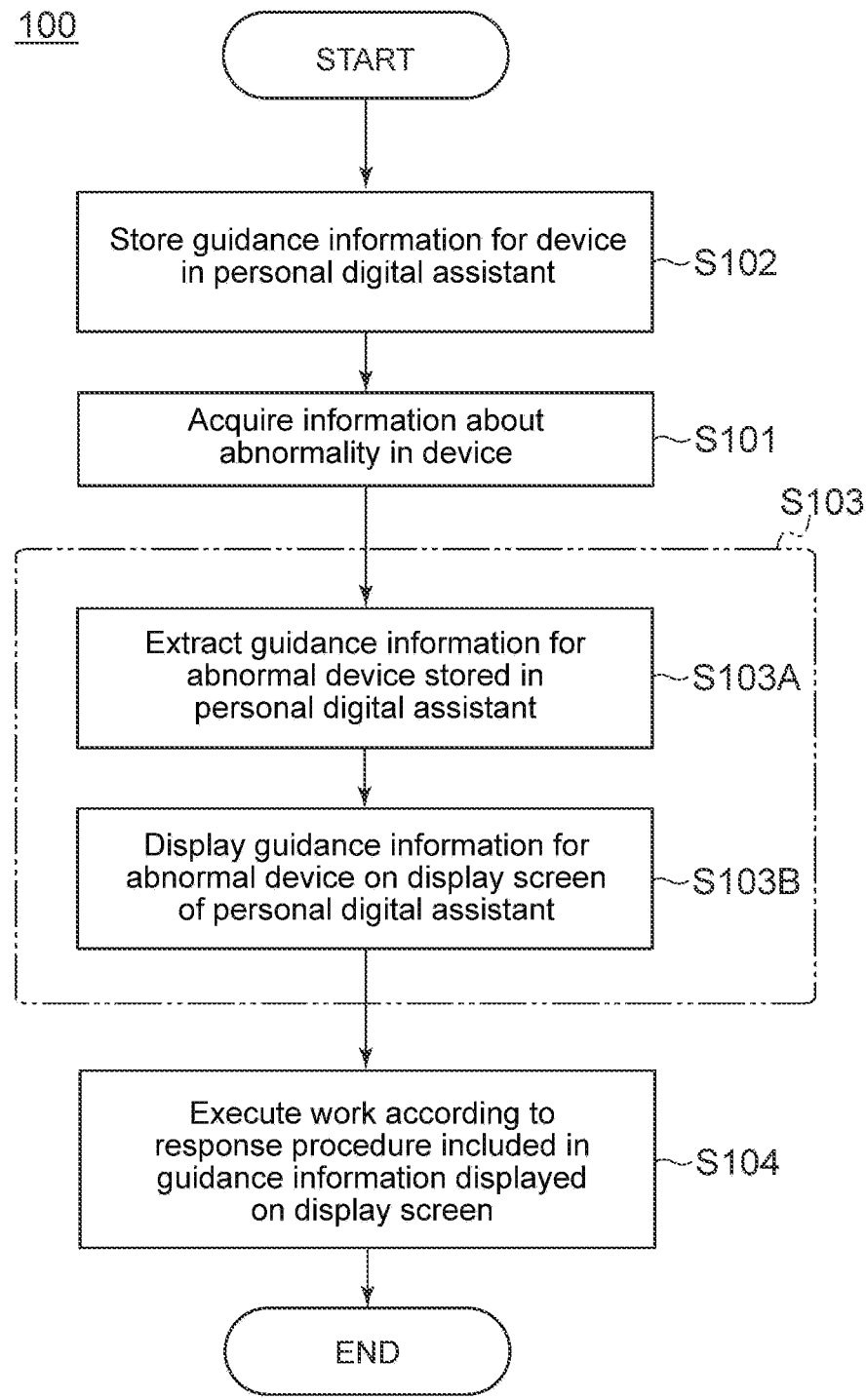

FIG. 4

| EAC Probable cause of abnormality | Occurrence probability PG | Response procedure RP | RC Required competence | 233 Drawing | 231 Relevant information Inspection history | 234 Manual | 232 Fault Tree diagram | Record of response status | WR Work result |
|---|---|---|---|---|---|---|---|---|---|
| xxx | 70% | xxx | Level A | 📄 | 📄 | 📄 | 📄 | 📷🎥🎤📄 | Problem is not resolved |
| xxx | 20% | xxx | Level A | | | | | | Problem is resolved |
| xxx | 5% | xxx | Level B | | | | | | |

241

Record of response status
(Photo, moving image, sound, text)

20

|  | Threshold of thermometer: less than ○ | Threshold of thermometer: ○~△ | Threshold of thermometer: △ or more |
|---|---|---|---|
| Threshold of vibration meter: less than ○ | Normal | Abnormal sign | Abnormal |
| Threshold of vibration meter: ○~△ | Abnormal sign | Abnormal | Abnormal |
| Threshold of vibration meter: △ or more | Abnormal | Abnormal | Abnormal |

FIG. 10

PERSONAL DIGITAL ASSISTANT AND INSPECTION SUPPORT SYSTEM

TECHNICAL FIELD

The present disclosure relates to a personal digital assistant and an inspection support system for supporting inspection of at least one device disposed in an inspection target area.

This application claims the priority of Japanese Patent Application No. 2021-176909 filed on Oct. 28, 2021, the content of which is incorporated herein by reference.

BACKGROUND

For example, patrol inspection of a plant such as a thermal power plant includes various works such as touching, reading of a meter such as an analog meter, detection of abnormal noise, and confirmation of steam leakage. These works may need to be executed several times a day in alternate shifts and if these works are executed by patrols (persons), a problem, such as an increase in inspection cost or a shortage of workers, arises. In order to solve the above problem, an attempt has been made to improve efficiency of the inspection work (see Patent Documents 1 and 2).

Patent Document 1 discloses an invention in which the same operation guidance is displayed on a display unit of a central monitoring room and a display unit of a mobile terminal, so that an operator located in the vicinity of a device to be controlled can execute inspection work while communicating with an observer residing in the central monitoring room. The central monitoring room and the mobile terminal are connected via wired LAN and wireless LAN so that information such as voice data or operation guidance can be communicated. According to the invention described in Patent Document 1, the operator can sequentially execute the inspection work sequentially designated by the operation guidance while communicating by voice with the observer who is watching the same operation guidance, making it possible to execute the inspection work errorlessly, accurately, and efficiently.

Patent Document 2 discloses a maintenance work support system that includes a display terminal to which inspection data is input at the time of inspection, and a server for receiving the inspection data transmitted from the display terminal and transmitting guidance information related to the received inspection data and information on a document or a drawing related to the guidance information. The above-described display terminal includes a guidance information display unit configured to display guidance information indicating how to deal with an abnormality transmitted from the server or information on a document or a drawing related to the guidance information. According to the invention described in Patent Document 2, an inspection worker inputs the inspection data to the display terminal during fieldwork, allowing the inspection worker to acquire information necessary for inspection, such as the guidance information indicating how to deal with the abnormality.

CITATION LIST

Patent Literature

Patent Document 1: JPH10-187229
Patent Document 2: JP2008-304997A

SUMMARY

As a measure to reduce an inspection cost in patrol inspection, a measurement value of an analog meter or the like may be digitized by a wireless sensor and transmitted to a portable device (for example, a mobile terminal carried by a patrol) via wireless communication by the wireless sensor. If sensor data output from the above-described wireless sensor is retrieved by the portable device, in order to suppress leakage of the sensor data to the outside or to suppress battery consumption of the wireless sensor so that the wireless sensor can be used for a long time, data communication between the wireless sensor and the device may use low-power near field communication such as Bluetooth® or Radio Frequency Identification (RFID). Further, in order to suppress leakage of the sensor data to the outside, a restriction is placed on data communication between the device and a control PC placed in a central control room etc., and the data communication between the device and the control PC may not be performed all the time. For example, data may be transmitted and received between the device and the control PC when the patrol returns to the central control room.

The inventions described in Patent Document 1 and Patent Document 2 require exchange of the inspection data, the guidance information, or the voice data, constant communication between the device (mobile terminal or the display terminal) carried by the inspection worker and the monitoring device (the central monitoring room or the server) is required during the inspection work. These inventions are difficult to apply under the restriction described above.

In view of the above, an object of at least one embodiment of the present disclosure is to provide a personal digital assistant capable of displaying guidance information for responding to an abnormal device even under an environment where a restriction is placed on information transmission by data communication or the like, and an inspection support system including the personal digital assistant.

A personal digital assistant according to an embodiment of the present disclosure is a personal digital assistant for supporting inspection of at least one device disposed in an inspection target area, that includes: an abnormality acquisition unit configured to acquire information about an abnormality in the at least one device; a guidance information storage unit configured to store guidance information which at least includes at least one response procedure for each abnormal event in the at least one device and information about response capability required to execute the at least one response procedure; and a display unit configured to refer to the guidance information stored in the guidance information storage unit, and display the guidance information for responding to an abnormal device which is the device where the abnormality is acquired by the abnormality acquisition unit.

An inspection support system according to an embodiment of the present disclosure is an inspection support system for supporting inspection of at least one device disposed in an inspection target area, that includes: the personal digital assistant; and a data server configured to perform information transmission with the personal digital assistant, the data server including a server-side guidance information storage unit configured to store the guidance information transmitted from the personal digital assistant.

According to at least one embodiment of the present disclosure, provided are a personal digital assistant capable of displaying guidance information for responding to an abnormal device even under an environment where a restriction is placed on information transmission by data communication or the like, and an inspection support system including the personal digital assistant.

BRIEF DESCRIPTION OF DRAWINGS

FIG. 3 is a flowchart of an inspection method using the inspection support system according to an embodiment of the present disclosure.

FIG. 4 is an explanatory view for describing guidance information displayed on a display screen of the personal digital assistant according to an embodiment of the present disclosure.

FIG. 10 is an explanatory table for describing the method of comparing the determination index and the inspection result of the device according to an embodiment of the present disclosure.

DETAILED DESCRIPTION

Figure 1:
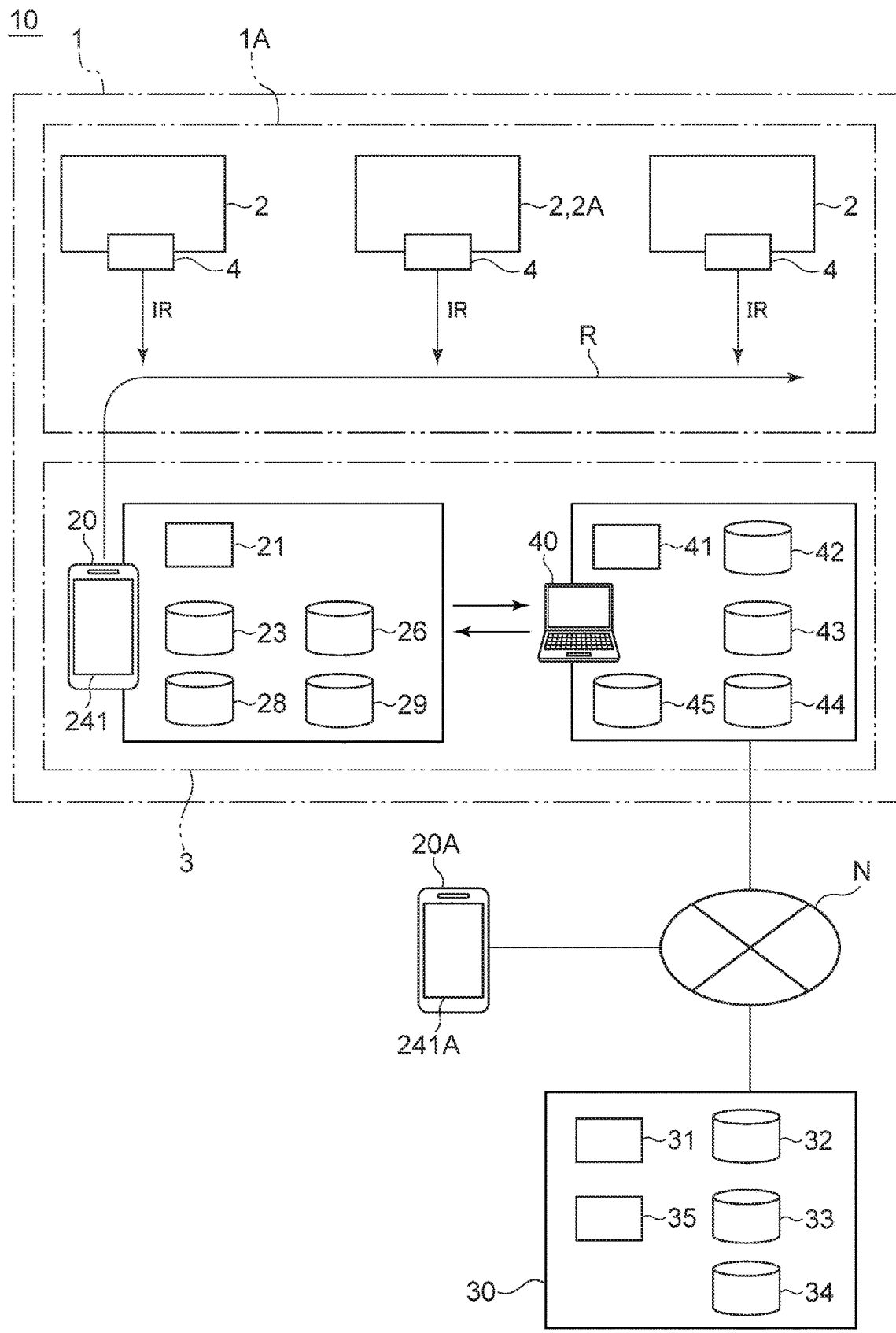
FIG. 1 is a schematic configuration diagram schematically showing the configuration of an inspection support system according to an embodiment of the present disclosure.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including" or "having" one constitutional element is not an exclusive expression that excludes the presence of other constitutional elements.

The same configurations are indicated by the same reference characters and may not be described again in detail.

(Inspection Support System)

Figure 2:
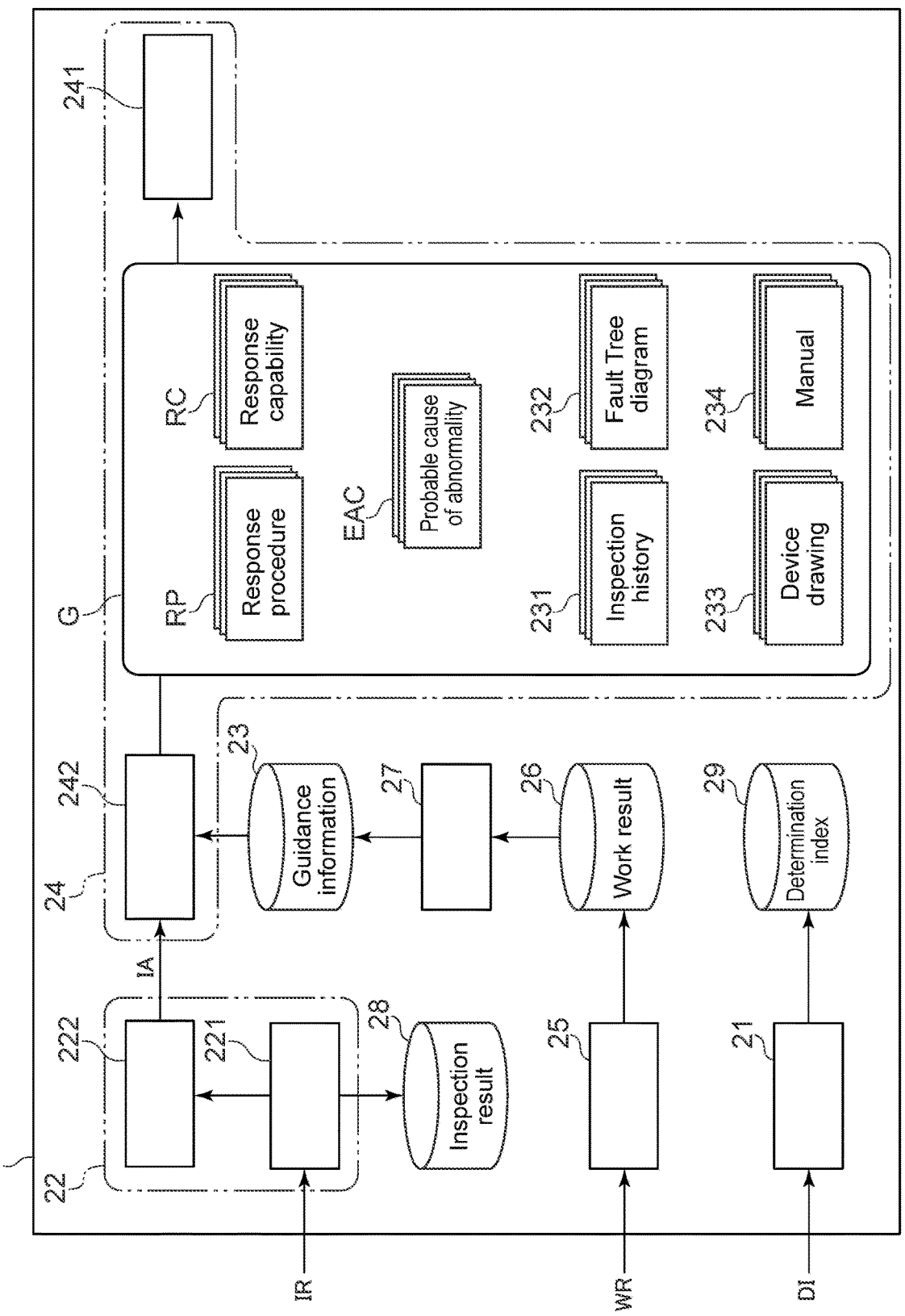
FIG. 2 is a schematic configuration diagram schematically showing the configuration of a personal digital assistant according to an embodiment of the present disclosure.

FIG. 1 is a schematic configuration diagram schematically showing the configuration of an inspection support system according to an embodiment of the present disclosure. FIG. 2 is a schematic configuration diagram schematically showing the configuration of a personal digital assistant according to an embodiment of the present disclosure. An inspection support system 10 according to some embodiments is provided to support inspection of at least one device 2 to be inspected disposed in an inspection target area 1, as shown in FIG. 1. The inspection support system 10 at least includes a personal digital assistant 20, and a data server 30 configured to enable information transmission with the personal digital assistant 20.

In the present disclosure, "configured to enable information transmission" can be configured to enable mutual information transmission (movement of electronic data), and may be configured to enable at least one of, for example, mutual communication via a network line or data movement via a storage medium such as an SD card.

In the illustrated embodiment, the inspection support system 10 further includes a control terminal 40 configured to enable information transmission with each of the personal digital assistant 20 and the data server 30. The personal digital assistant 20 is configured to enable mutual information transmission with the data server 30 via the control terminal 40. The personal digital assistant 20, the data server 30, and the control terminal 40 respectively include interfaces for information transmission (information transmission units) 21, 31, and 41.

In the embodiment shown in FIG. 1, the data server 30 or the control terminal 40 is connected to a communication network N such as LAN or WAN. The personal digital assistant 20 may be connected to the communication network N, and data may be moved to and from the control terminal 40 via the above-described storage medium.

As shown in FIG. 1, the inspection support system 10 may further include at least one personal digital assistant 20A different from the above-described personal digital assistant 20. The personal digital assistant 20A has the same configuration as the personal digital assistant 20. In the figure, among components of the personal digital assistant 20A, the same components as those of the personal digital assistant 20 are denoted by A at the end of the reference signs, respectively. The personal digital assistant 20 is configured to enable mutual information transmission with the data server 30 via the control terminal 40.

Hereinafter, a description will be given by taking, as an example, a case where the inspection target area 1 includes the premises of a plant (factory facility) and the above-described at least one device 2 includes a plant component that composes the above-described plant. As shown in FIG. 1, the control terminal 40 may be disposed in a central control room 3 for controlling or monitoring the above-described plant.

The personal digital assistant 20 may be placed under an environment where a restriction is temporarily placed on information transmission to the data server 30 or the control terminal 40. In one embodiment, if the personal digital assistant 20 is located in a region 1A (see FIG. 1) where the restriction is placed on information transmission in the inspection target area 1, information cannot be transmitted to the data server 30 or the control terminal 40. The above-described region 1A does not include the central control room 3. The above-described region 1A includes the at least one device 2 to be inspected. If the personal digital assistant 20 is located outside the range of the above-described region 1A such as the central control room 3, information can be transmitted to the data server 30 or the control terminal 40.

As shown in FIG. 2, the personal digital assistant 20 at least includes the above-described interface for information transmission 21, an abnormality acquisition unit 22, a guidance information storage unit 23, and a display unit 24 including a display screen 241.

(Inspection Method Using Inspection Support System)

FIG. 3 is a flowchart of an inspection method using the inspection support system according to an embodiment of the present disclosure. An inspection method 100 according to some embodiments is an inspection method for the at least one device 2 disposed in the inspection target area 1. As shown in FIG. 3, the inspection method 100 includes an abnormality acquisition step S101, a guidance information storage step S102, and a display step S103. Some steps in the inspection method 100 may be performed by an apparatus or a device of the inspection support system 10, or may be performed by an apparatus or a device other than the inspection support system 10. Further, some steps in the inspection method 100 may be performed manually.

The abnormality acquisition step S101 includes acquiring information about abnormality IA of the at least one device 2 disposed in the inspection target area 1 (region 1A). The information about abnormality IA of the device 2 includes information indicating that the status of the device 2 is abnormal. The information about abnormality IA of the device 2 may include information for specifying an abnormal event AE in the device 2. The information about abnormality IA of the device 2 can be acquired from an inspection result IR of the device 2. The inspection result IR of the device 2 may be acquired by causing an inspector who possesses the personal digital assistant 20 to move to the vicinity of the device 2 (within the range of the region 1A) and inspect the device 2. Further, the inspection result IR of the device 2 may be acquired from the control terminal 40 disposed in the central control room 3. The control terminal 40 may be configured to receive the status of the device 2 from the device 2 disposed in the inspection target area 1.

In the illustrated embodiment, the abnormality acquisition unit 22 of the personal digital assistant 20 performs the abnormality acquisition step S101. The abnormality acquisition unit 22 is configured to acquire the information about abnormality IA of the at least one device 2 to be inspected. The device 2 where the information about abnormality IA is acquired by the abnormality acquisition unit 22 is an abnormal device 2A where the status of the device 2 is not normal.

The guidance information storage step S102 includes storing guidance information G for the at least one device 2 to be inspected in the personal digital assistant 20. The guidance information storage step S102 is performed before the abnormality acquisition step S101. In the illustrated embodiment, the personal digital assistant 20 includes the guidance information storage unit 23 configured to store the guidance information G for the at least one device 2. The data server 30 includes a server-side guidance information storage unit 32 configured to store the guidance information G for the at least one device 2. The personal digital assistant 20 stores the guidance information G transmitted from the server-side guidance information storage unit 32 in the guidance information storage unit 23, before the abnormality acquisition step S101.

The display step S103 includes referring to the guidance information G stored in the personal digital assistant 20 in the guidance information storage step S102, and displaying, on the display screen 241 of the personal digital assistant 20, the guidance information G for responding to the abnormal device 2A which is the device 2 where the information about abnormality IA is acquired in the abnormality acquisition step S101.

The display step S103 includes a guidance information extraction step S103A of extracting the guidance information G for responding to the abnormal device 2A from among the guidance information G stored in the guidance information storage unit 23, and a guidance information display step S103B of displaying, on the display screen 241 of the personal digital assistant 20, the guidance information G for responding to the abnormal device 2A extracted in the guidance information extraction step S103A.

In the illustrated embodiment, the display unit 24 of the personal digital assistant 20 performs the display step S103. As shown in FIG. 2, the display unit 24 of the personal digital assistant 20 includes the above-described display screen 241, and a guidance information extraction unit 242 configured to extract the guidance information G for responding to the abnormal device 2A from among the guidance information G stored in the guidance information storage unit 23. The display unit 24 is configured to display, on the display screen 241, the guidance information G for responding to the abnormal device 2A extracted by the guidance information extraction unit 242.

FIG. 4 is an explanatory view for describing the guidance information displayed on the display screen of the personal digital assistant according to an embodiment of the present disclosure. As shown in FIG. 2, 4, the guidance information G at least includes at least one response procedure RP for each abnormal event AE in the at least one device 2 described above, and information about response capability RC required to execute the at least one response procedure RP. As shown in FIG. 4, the display step S103 includes displaying, on the display screen 241, the at least one response procedure RP for each abnormal event AE in the abnormal device 2A or the information about the response capability RC required for execution of each response procedure RP. As shown in FIG. 3, the inspection method 100 further includes a work execution step S104 of executing work according to the response procedure RP which is displayed on the display screen 241 in the display step S103 and can be executed by the inspector.

If the plurality of response procedures RP are displayed on the display screen 241, the inspector executes the work according to the response procedure RP which can be executed by the inspector among the plurality of response procedures RP. Whether the response procedure RP can be executed by the inspector can be determined from the information about response capability RC.

As shown in FIG. 3, the inspection method 100 according to some embodiments at least includes the above-described abnormality acquisition step S101, the above-described guidance information storage step S102, and the above-described display step S103. With the above method, if the abnormality in the at least one device (abnormal device 2A) is acquired in the abnormality acquisition step S101, the guidance information G for responding to the abnormal device 2A can be displayed on the display screen 241 of the personal digital assistant 20 in the display step S103. The guidance information storage step S102 includes storing the guidance information G for the at least one device 2 to be inspected in the personal digital assistant 20, before the inspector executes inspection. Thus, the personal digital assistant 20 can display the guidance information G for responding to the abnormal device 2A on the display screen 241 even under an environment where a restriction is placed on information transmission by data communication or the like.

As shown in FIG. 2, the personal digital assistant 20 according to some embodiments at least includes the above-described abnormality acquisition unit 22, the above-described guidance information storage unit 23, and the above-described display unit 24. With the above configuration, if the abnormality in the at least one device (abnormal device 2A) is acquired by the abnormality acquisition unit 22, the personal digital assistant 20 can display, on the display screen 241 (display unit 24), the guidance information G for responding to the abnormal device 2A stored in the guidance information storage unit 23. The guidance information storage unit 23 prestores the guidance information G for the at least one device 2 to be inspected, before the inspector executes inspection. Thus, the personal digital assistant 20 can display the guidance information G for responding to the abnormal device 2A on the display screen 241 even under the environment where the restriction is placed on information transmission by data communication or the like.

Since the guidance information G displayed on the display screen 241 includes the at least one response procedure RP for each abnormal event AE in the abnormal device 2A, the inspector who visually recognizes the guidance information G can execute the work according to the response procedure RP. Further, the guidance information G displayed on the display screen 241 includes the information about response capability RC required for execution of each response procedure RP. Thus, although the response procedure RP that can be handled differs depending on the competence of the inspector, the inspector who visually recognizes the guidance information G can execute the work according to the response procedures RP that can be executed by the inspector among the response procedures RP displayed on the display screen 241. With the guidance information G displayed on the display screen 241, the inspector can quickly take appropriate countermeasures against the abnormal device 2A, making it possible to shorten a time required to resolve a problem with the abnormal device 2A, and to reduce an inspection cost.

In some embodiments, as shown in FIG. 2, 4, the guidance information G stored in the guidance information storage unit 23 described above further includes at least one of an inspection history 231, a Fault Tree diagram 232, a drawing 233, or a manual 234 of the at least one device 2. Each of the inspection history 231, the Fault Tree diagram 232, the drawing 233, and the manual 234 is transmitted from the server-side guidance information storage unit 32 to the personal digital assistant 20 and is stored in guidance information storage unit 23 in the guidance information storage step S102.

In the display step S103, as the guidance information G for responding to the abnormal device 2A, the personal digital assistant 20 may display, on the display screen 241, at least one of the inspection history 231, the Fault Tree diagram 232, the drawing 233, or the manual 234 of the abnormal device 2A as shown in FIG. 4. Further, at the request of the inspector, the personal digital assistant 20 may display, on the display screen 241, at least one of the inspection history 231, the Fault Tree diagram 232, the drawing 233, or the manual 234 of the abnormal device 2A.

With the above configuration, the guidance information G displayed on the display screen 241 includes any of the inspection history 231, the Fault Tree diagram 232, the drawing 233, or the manual 234 of the abnormal device 2A. In this case, the inspector visually recognizes the inspection history 231, the Fault Tree diagram 232, the drawing 233, the manual 234, or the like of the abnormal device 2A displayed on the display screen 241, allowing the inspector to take more appropriate countermeasures against the abnormal device 2A. Thus, it is possible to shorten the time required to resolve the problem with the abnormal device 2A, and to reduce the inspection cost.

Figure 5:
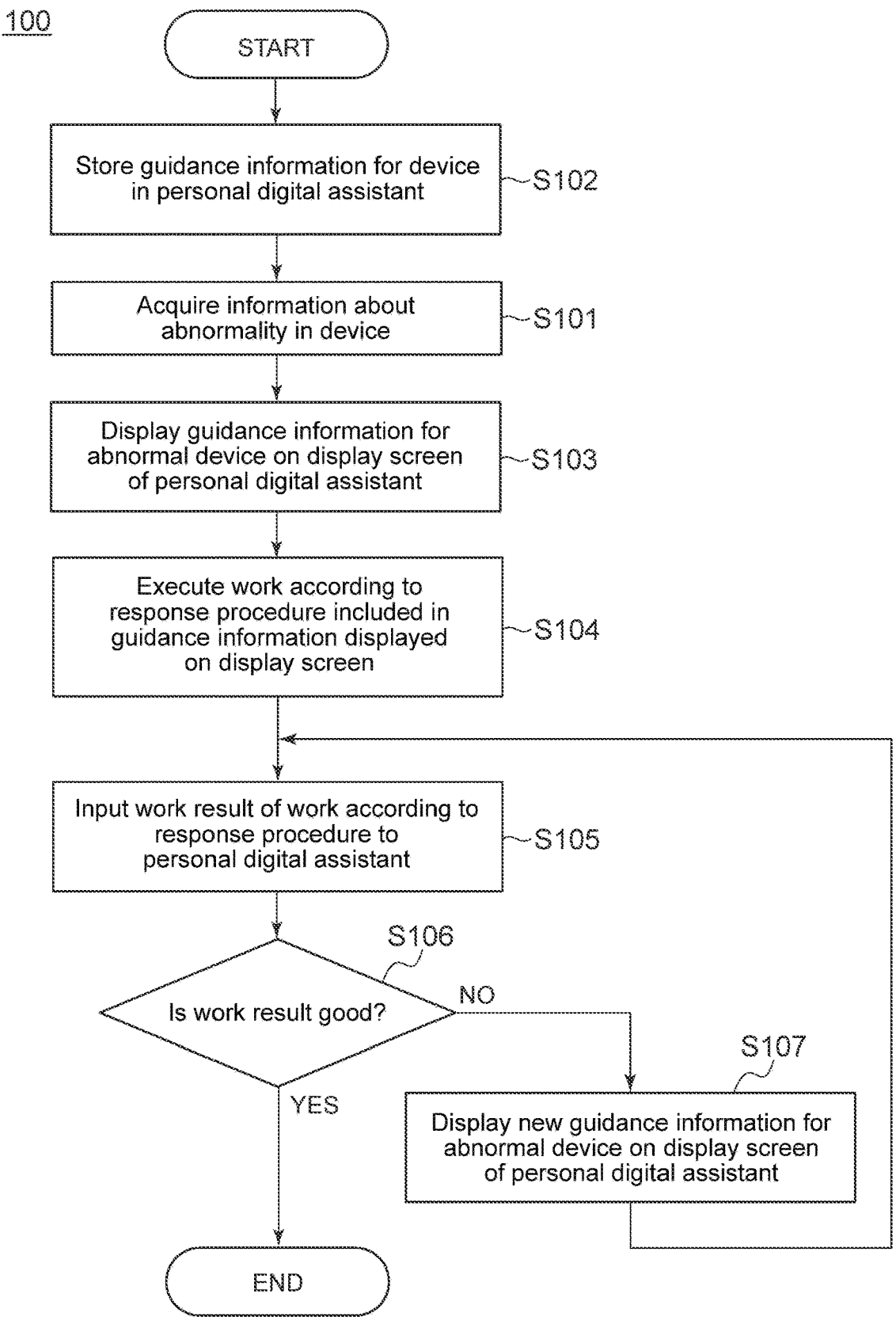
FIG. 5 is a flowchart of the inspection method using the inspection support system according to an embodiment of the present disclosure.

FIG. 5 is a flowchart of the inspection method using the inspection support system according to an embodiment of the present disclosure. In some embodiments, as shown in FIG. 2, the above-described personal digital assistant 20 further includes a work result input unit 25 configured to allow a work result WR of work according to the above-described at least one response procedure RP to be input. In addition, the personal digital assistant 20 further includes a work result storage unit 26 configured to store the work result WR. As shown in FIG. 5, the above-described inspection method 100 further includes a work result input step S105 of inputting, to the personal digital assistant 20, the work result WR of the work according to the response procedure RP executed by the inspector in the work execution step S104.

The work result input step S105 includes causing the inspector to input the work result WR to the work result input unit 25. The work result WR input to the work result input unit 25 is stored in the work result storage unit 26. The work result WR includes a good result in which the abnormality in the abnormal device 2A is resolved and a bad result in which the abnormality in the abnormal device 2A is not resolved.

With the above configuration, since the personal digital assistant 20 inputs the work result WR of the work according to the response procedure RP to the work result input unit 25, it is possible to accumulate the results of whether the abnormality (abnormal event AE) in the abnormal device 2A is resolved by the response procedure RP.

In some embodiments, the display unit 24 of the personal digital assistant 20 described above is configured to display the new guidance information G if the work result WR input to the work result input unit 25 is not good. As shown in FIG. 5, the above-described inspection method 100 further includes a second display step S107 of displaying the new guidance information G on the display screen 241 of the personal digital assistant 20 if the work result WR input in the work result input step S105 is not good ("No" in S106).

The new guidance information G is the guidance information G for responding to the abnormal device 2A, and means the guidance information G that differs from the guidance information G, which is displayed on the display screen 241 in the display step S103, in at least one response procedure RP. In one embodiment, the new guidance information G does not include, among the response procedures RP displayed on the display screen 241 in the display step S103, the response procedure RP according to which the work result WR is not good.

With the above configuration, in case where the abnormality (abnormal event AE) in the abnormal device 2A still cannot be resolved even if the inspector responds in accordance with the response procedure RP which is included in the guidance information G displayed on the display screen 241 (display unit 24), the reconsidered new guidance information G can be displayed on the display screen 241 (display unit 24) by inputting the work result WR to the work result input unit 25. In this case, the inspector can quickly respond in accordance with the response procedure RP included in the reconsidered new guidance information G, making it possible to shorten the time required to resolve the problem with the abnormality in the abnormal device 2A, and to reduce the inspection cost.

In some embodiments, as shown in FIG. 2, the above-described personal digital assistant 20 further includes a guidance information update unit 27 configured to update the guidance information G in consideration of the work result WR input to the work result input unit 25. The guidance information update unit 27 may update the guidance information G stored in the guidance information storage unit 23, in consideration of the work result WR stored in the work result storage unit 26. The display unit 24 may display the guidance information G updated by the guidance information update unit 27 as the above-described new guidance information G on the display screen 241 in the second display step S107.

With the above configuration, since the work result WR of the work according to the response procedure RP is input to the work result input unit 25, it is possible to accumulate the results of whether the abnormality (abnormal event AE) in the abnormal device 2A is resolved by the response procedure RP. Since the guidance information update unit 27 updates the guidance information G in consideration of the work result WR of the work according to the response procedure RP, it is possible to improve the accuracy of the response procedure RP included in the guidance information G. Thus, it is possible to make the response procedure RP, which is displayed on the display screen 241 (display unit 24) in next and subsequent inspections, more appropriate.

In some embodiments, the above-described personal digital assistant 20 includes the above-described abnormality acquisition unit 22, the above-described guidance information storage unit 23, the above-described display unit 24, the above-described work result input unit 25, and the above-described guidance information update unit 27. The server-side guidance information storage unit 32 of the data server 30 described above is configured to store the guidance information G transmitted from the personal digital assistant 20 describe above.

The personal digital assistant 20 stores the guidance information G updated by the guidance information update unit 27 in the guidance information storage unit 23, under the environment where the restriction is temporarily placed on information transmission to the data server 30 or the control terminal 40. When the personal digital assistant 20 is placed under the environment where information can be transmitted to the data server 30 or the control terminal 40, the guidance information G, which is updated by the guidance information update unit 27 and stored in the guidance information storage unit 23, is transmitted to the control terminal 40 or the data server 30. The guidance information G updated by the guidance information update unit 27 is stored in the server-side guidance information storage unit 32.

With the above configuration, the guidance information G updated by the guidance information update unit 27 of the personal digital assistant 20 is stored in the server-side guidance information storage unit 32 of the data server 30. In this case, the guidance information G stored in the server-side guidance information storage unit 32 can also be transmitted to the personal digital assistant 20A other than the above-described personal digital assistant 20. Thus, since the guidance information G can be displayed on the display screen 241A of the personal digital assistant 20A, it is possible to make use of the above-described another personal digital assistant 20A in the work on the abnormal device 2A.

In some embodiments, the server-side guidance information storage unit 32 of the data server 30 described above is configured to further store the guidance information G transmitted from the at least one personal digital assistant 20A described above. With the above configuration, the guidance information G accumulated by the personal digital assistant 20 or the at least one personal digital assistant 20A is stored in the server-side guidance information storage unit 32. Since the guidance information G is stored in the guidance information storage unit 23 of the personal digital assistant 20 in the guidance information storage step S102, it is possible to improve the accuracy of the guidance information G displayed in the display step S103 or the second display step S107.

In some embodiments, the above-described data server 30 further includes a server-side work result storage unit 34 configured to store the work result WR of the work according to the response procedure RP for the at least one device 2 transmitted from the personal digital assistant 20 described above. When the personal digital assistant 20 is placed under the environment where information can be transmitted to the data server 30 or the control terminal 40, the work result WR stored in the work result storage unit 26 is transmitted to the control terminal 40 or the data server 30. The work result WR input to the work result input unit 25 is stored in the server-side work result storage unit 34.

With the above configuration, the work result WR input to the work result input unit 25 of the personal digital assistant 20 is stored in the server-side work result storage unit 34. In this case, the work results WR accumulated in the server-side work result storage unit 34 can be transmitted to the personal digital assistant 20 before the abnormality acquisition step S101. Since the guidance information update unit 27 can update the guidance information G, which is stored in the guidance information storage unit 23, in further consideration of the work result WR transmitted from the server-side work result storage unit 34, it is possible to improve the accuracy of the response procedure RP included in guidance information G. The server-side work result storage unit 34 may be configured to further store the work result WR transmitted from the at least one personal digital assistant 20A described above.

Figure 6:
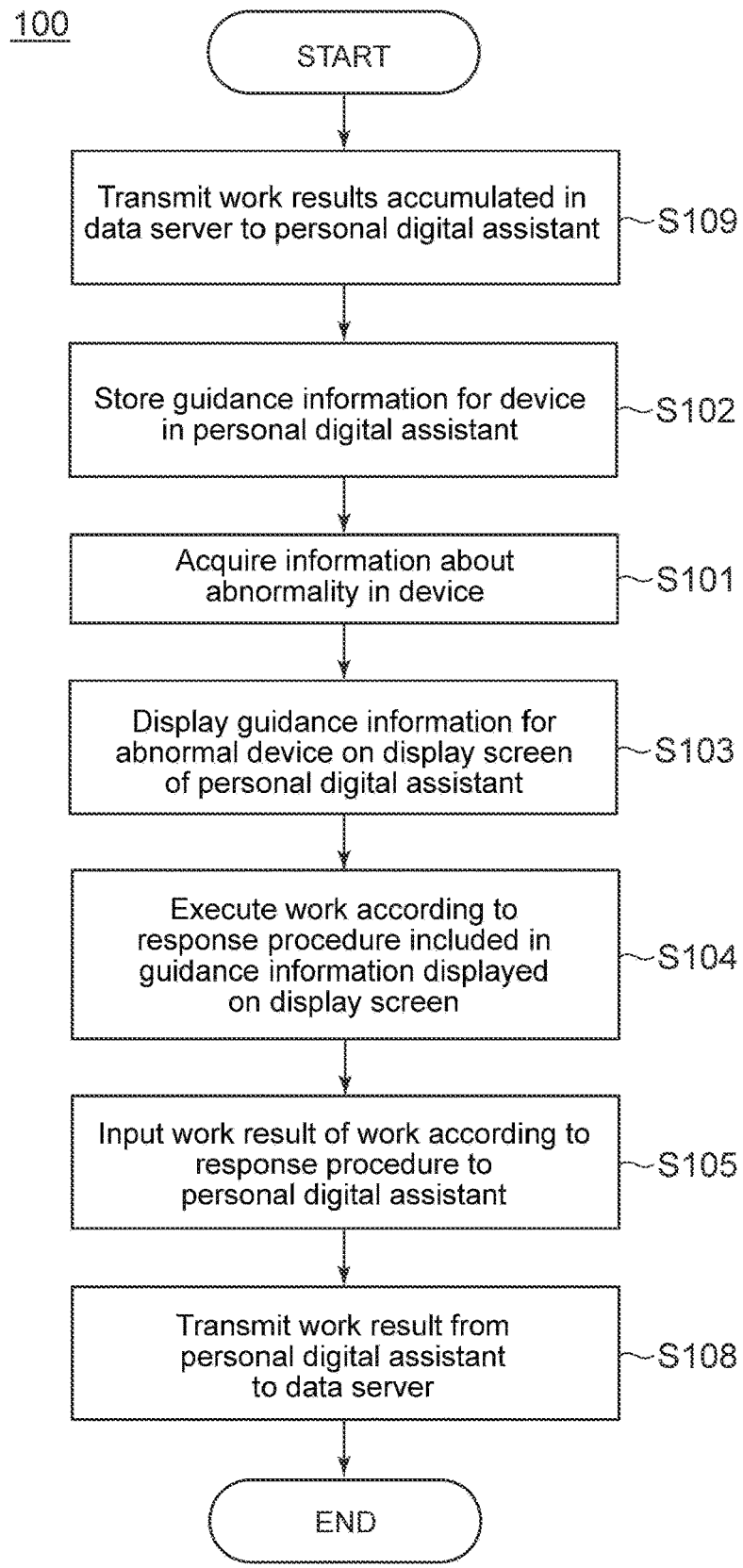
FIG. 6 is a flowchart of the inspection method using the inspection support system according to an embodiment of the present disclosure.

FIG. 6 is a flowchart of the inspection method using the inspection support system according to an embodiment of the present disclosure. As shown in FIG. 6, the above-described inspection method 100 may further include a step S108 of transmitting the work result WR stored in the work result storage unit 26 to the data server 30, after the work result input step S105. In addition, as shown in FIG. 6, the above-described inspection method 100 may further include a step S109 of transmitting the work result WR stored in the server-side work result storage unit 34 to the personal digital assistant 20, before the abnormality acquisition step S101.

In some embodiments, the guidance information G stored in the guidance information storage unit 23 described above further includes information about a plurality of probable causes of abnormality EAC associated with the abnormal event AE in the at least one device 2 described above, the information being about the plurality of probable causes of abnormality EAC respectively having occurrence probabilities PG of the plurality of probable causes of abnormality EAC, as shown in FIG. 4. The above-described at least one response procedure RP includes the plurality of response procedures RP respectively associated with the plurality of probable causes of abnormality EAC. As shown in FIG. 4, the above-described display unit 24 is configured to display a list of the plurality of response procedures RP in order of the occurrence probabilities PG.

In other words, the above-described guidance information G includes a plurality of combinations associated with the at least one abnormal event AE, and the plurality of combinations are composed of one probable cause of abnormality EAC associated with the abnormal event AE, the occurrence probability PG of the above-described one probable cause of abnormality EAC, and one response procedure RP associated with the above-described one probable cause of abnormality EAC. In the display step S103, the display unit 24 displays a list of the above-described plurality of combinations on the display screen 241 in order of the occurrence probability PG. The display unit 24 may display, on the display screen 241, only the response procedure RP among all the elements (probable cause of abnormality EAC, occurrence probability PG, response procedure RP) included in the plurality of combinations described above, or may display the other element (probable cause of abnormality EAC, occurrence probability PG) together, in addition to the response procedure RP.

With the above configuration, the plurality of response procedures RP are associated with the plurality of probable causes of abnormality EAC, respectively. If the abnormal event AE occurs in the device 2, it is highly likely that the cause is the probable cause of abnormality EAC having the high occurrence probability PG. Thus, in a case where the inspector executes the response procedure RP which is associated with the probable cause of abnormality EAC having the high occurrence probability PG, as compared with a case where the inspector executes the response procedure RP which is associated with the probable cause of abnormality EAC having a low occurrence probability PG, it is highly likely that the abnormality (abnormal event AE) in the device 2 is resolved. Since the display unit 24 of the personal digital assistant 20 displays the list of the plurality of response procedures RP in order of the occurrence probability PG of the probable cause of abnormality EAC, it is possible to prompt the inspector who visually recognizes the display unit 24 to execute the response procedure RP which is associated with the probable cause of abnormality EAC having the high occurrence probability PG. Thus, it is possible to shorten the time required to resolve the problem with the abnormal device 2A, and to reduce the inspection cost.

In some embodiments, the above-described personal digital assistant 20 includes the above-described abnormality acquisition unit 22, the above-described guidance information storage unit 23, the above-described display unit 24, the above-described work result input unit 25, and the above-described guidance information update unit 27. The above-described guidance information update unit 27 is configured to update the respective occurrence probabilities PG of the plurality of probable causes of abnormality EAC in consideration of the work result WR input to the work result input unit 25.

In one embodiment, the guidance information update unit 27 calculates the occurrence probability PG of each probable cause of abnormality EAC from the work result WR stored in the work result storage unit 26, based on association information in which the work result WR as input information and the occurrence probability PG of the probable cause of abnormality EAC as output information are associated with each other in advance. The above-described association information includes a list, a table, a map, a function, a machine learning model, or the like indicating the correspondence relationship between the above-described input information and the above-described output information. The above-described association information may be created based on routine test data, or may be created based on past performance values, experimental values, numerical analysis results, etc. other than the routine test data. For example, the occurrence probability PG of each probable cause of abnormality EAC may be calculated by using a Bayesian network whose input information is the work result WR stored in the work result storage unit 26.

In one embodiment, if the work result WR input to the work result input unit 25 is good, the guidance information update unit 27 may be configured to increase the occurrence probability PG of the probable cause of abnormality EAC which is associated with the response procedure RP executed when the above-described work result WR is acquired, relative to the original occurrence probability PG (the occurrence probability PG before the above-described work result WR is acquired). If the work result WR input to the work result input unit 25 is not good, the guidance information update unit 27 may be configured to decrease the occurrence probability PG of the probable cause of abnormality EAC which is associated with the response procedure RP executed when the above-described work result WR is acquired, relative to the original occurrence probability PG (the occurrence probability PG before the above-described work result WR is acquired).

With the above configuration, since the inspector inputs the work result WR of the work according to the response procedure RP to the work result input unit 25, it is possible to accumulate the results of whether the abnormality (abnormal event AE) in the abnormal device 2A is resolved by the response procedure RP. Since the guidance information update unit 27 updates the guidance information G in consideration of the work result WR of the work according to the response procedure RP, it is possible to improve the accuracy of the occurrence probability PG of each of the plurality of probable causes of abnormality EAC. Thus, it is possible to make the display order of the response procedures RP, the list of which is displayed on the display unit 24 in the next and subsequent inspections, more appropriate.

(Abnormality Determination Method)

In some embodiments, as shown in FIG. 2, the above-described abnormality acquisition unit 22 includes an inspection result acquisition unit 221 configured to acquire the inspection result IR of the at least one device 2 described above, and an abnormality determination unit 222 configured to determine the abnormality in the at least one device 2 in consideration of the inspection result IR of the at least one device 2 acquired by the inspection result acquisition unit 221.

The inspection result acquisition unit 221 acquires the inspection result IR of the at least one device 2 from the outside of the personal digital assistant 20. In the illustrated embodiment, the inspection result acquisition unit 221 is constituted by a receiving unit configured to acquire the inspection result IR of the at least one device 2 transmitted from at least one wireless sensor 4 (see FIG. 1) provided in the above-described at least one device 2 via wireless communication.

The wireless sensor 4 is configured to acquire, as measurement data (inspection result IR), the status of the device 2 mounted with the wireless sensor 4, or more specifically a desired physical quantity regarding the device 2 (at least one of a mechanical property, an electromagnetic property, a thermal property, an acoustic property, a scientific property, or spatial information or temporal information regarding the device 2). Further, the wireless sensor 4 is configured to output the measurement data (inspection result IR) acquired by the wireless sensor 4 via wireless communication using a wireless communication method such as Bluetooth (registered trademark).

Patrol inspection is executed in which the inspector carrying the personal digital assistant 20 patrols the inspection target area 1 including the region 1A described above along an inspection route R at prescribed intervals, and passes near the at least one wireless sensor 4. In the patrol inspection, if the personal digital assistant 20 falls within a communication range of a radio wave transmitted from the wireless sensor 4, the receiving unit (inspection result acquisition unit 221) of the personal digital assistant 20 receives the measurement data (inspection result IR) acquired by the wireless sensor 4. It is only necessary that the inspection result acquisition unit 221 is configured to acquire the inspection result IR of the at least one device 2, and the present disclosure is not limited to the above-described receiving unit.

With the above configuration, since the personal digital assistant 20 includes the inspection result acquisition unit 221 and the abnormality determination unit 222, even under the environment where the restriction is placed on information transmission by data communication or the like, it is possible to determine the abnormality in the at least one device 2 describe above, in consideration of the inspection result IR of the at least one device 2. If the abnormality in the device 2 is determined by the abnormality determination unit 222, the personal digital assistant 20 can display the guidance information G for responding to the abnormal device 2A stored in the guidance information storage unit 23 on the display screen 241 (display unit 24). In this case, the inspector can immediately visually recognize the guidance information G displayed on the display screen 241 (display unit 24) after confirming the abnormality in the device 2 in the vicinity of the device 2, making it possible to promptly take appropriate countermeasures against the abnormal device 2A.

In some embodiments, as shown in FIG. 1, the above-described data server 30 further includes a determination index calculation unit 35 configured to calculate a determination index DI for determining whether the above-described at least one device 2 is abnormal. As shown in FIG. 1, 2, the above-described personal digital assistant 20 further includes a determination index storage unit 29 configured to store the determination index DI calculated by the determination index calculation unit 35. The above-described abnormality determination unit 222 is configured to determine the abnormality in the at least one device 2 by comparing the determination index DI stored in the determination index storage unit 29 with the inspection result IR of the at least one device 2 acquired by the inspection result acquisition unit 221.

If the inspection result IR of the at least one device 2 described above includes the measurement data of the plurality of wireless sensors 4, the determination index calculation unit 35 may calculate the plurality of determination indexes DI respectively corresponding to the plurality of measurement data. The determination index DI can determine whether the inspection result IR (measurement data) corresponding to the determination index DI falls within a normal range.

Figure 7:
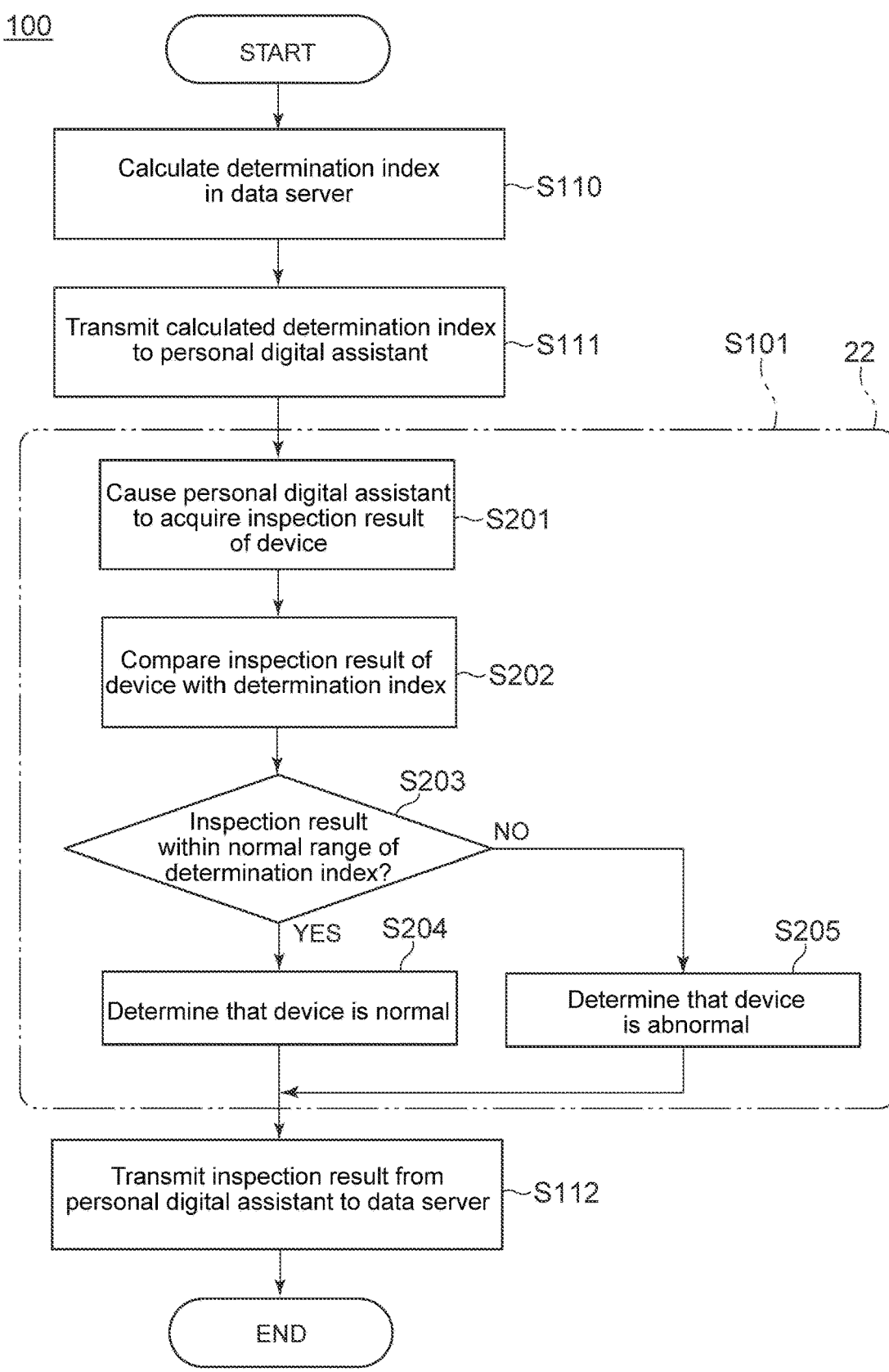
FIG. 7 is a flowchart of the inspection method using the inspection support system according to an embodiment of the present disclosure.

FIG. 7 is a flowchart of the inspection method using the inspection support system according to an embodiment of the present disclosure. As shown in FIG. 7, the above-described inspection method 100 further includes a determination index calculation step S110 of calculating the at least one determination index DI in the data server 30, and a determination index transmission step S111 of transmitting the at least one determination index DI calculated in the determination index calculation step S110 to the personal digital assistant 20. The determination index calculation step S110 and the determination index transmission step S111 are performed before the abnormality acquisition step S101. The personal digital assistant 20 stores the determination index DI transmitted from the data server 30 in the determination index storage unit 29, before the abnormality acquisition step S101.

The above-described abnormality acquisition step S101 includes an inspection result acquisition step S201 of causing the personal digital assistant 20 to acquire the inspection result IR of the at least one device 2, and a comparison step S202 of comparing the at least one inspection result IR acquired in the inspection result acquisition step S201 with the at least one determination index DI. In the illustrated embodiment, the inspection result acquisition step S201 is performed by the inspection result acquisition unit 221. The comparison step S202 is performed by the abnormality determination unit 222.

If the at least one inspection result IR falls within the normal range which is indicated by the determination index DI associated with the inspection result IR ("YES" in step S203), the abnormality determination unit 222 determines that the device 2 having acquired the inspection result IR is normal (step S204). If the at least one inspection result IR falls out of the normal range which is indicated by the determination index DI associated with the inspection result IR ("NO" in step S203), the abnormality determination unit 222 determines that the device 2 having acquired the inspection result IR is not normal (step S205). In this case, the abnormality acquisition unit 22 acquires the information about abnormality IA of the device 2 having acquired the inspection result IR.

As shown in FIG. 7, the above-described inspection method 100 may further include an inspection result transmission step S112 of transmitting the inspection result IR of the at least one device 2 from the personal digital assistant 20 to the data server 30. The personal digital assistant 20 further includes an inspection result storage unit 28 configured to store the inspection result IR of the at least one device 2 acquired by the inspection result acquisition unit 221. The data server 30 further includes a server-side inspection result storage unit 33 configured to store the inspection result IR of the at least one device 2 transmitted from the personal digital assistant 20.

When the personal digital assistant 20 is placed under the environment where information can be transmitted to the data server 30 or the control terminal 40, the inspection result IR stored in the inspection result storage unit 28 is transmitted to the control terminal 40 or the data server 30. The inspection result IR acquired by the inspection result acquisition unit 221 is stored in the server-side inspection result storage unit 33. The server-side inspection result storage unit 33 may further store the determination result by the abnormality determination unit 222 in association with the inspection result TR. In addition, the server-side inspection result storage unit 33 may be configured to further store the inspection result IR transmitted from the at least one personal digital assistant 20A described above.

With the above configuration, the determination index DI is calculated in advance by the determination index calculation unit 35 of the data server 30, is transmitted to the personal digital assistant 20, and is stored in the determination index storage unit 29. The abnormality determination unit 222 of the personal digital assistant 20 can determine the abnormality in the at least one device 2 by comparing the determination index DI stored in the determination index storage unit 29 with the inspection result IR of the at least one device 2 acquired by the inspection result acquisition unit 221. In this case, the personal digital assistant 20 need not perform processing with a high computational load such as calculation of the determination index DI, allowing even the personal digital assistant 20 with low computational resources to accurately determine the abnormality in the device 2. Further, the personal digital assistant 20 can promptly determine the abnormal device 2A even under the environment where the restriction is placed on information transmission by data communication or the like.

Figure 8:
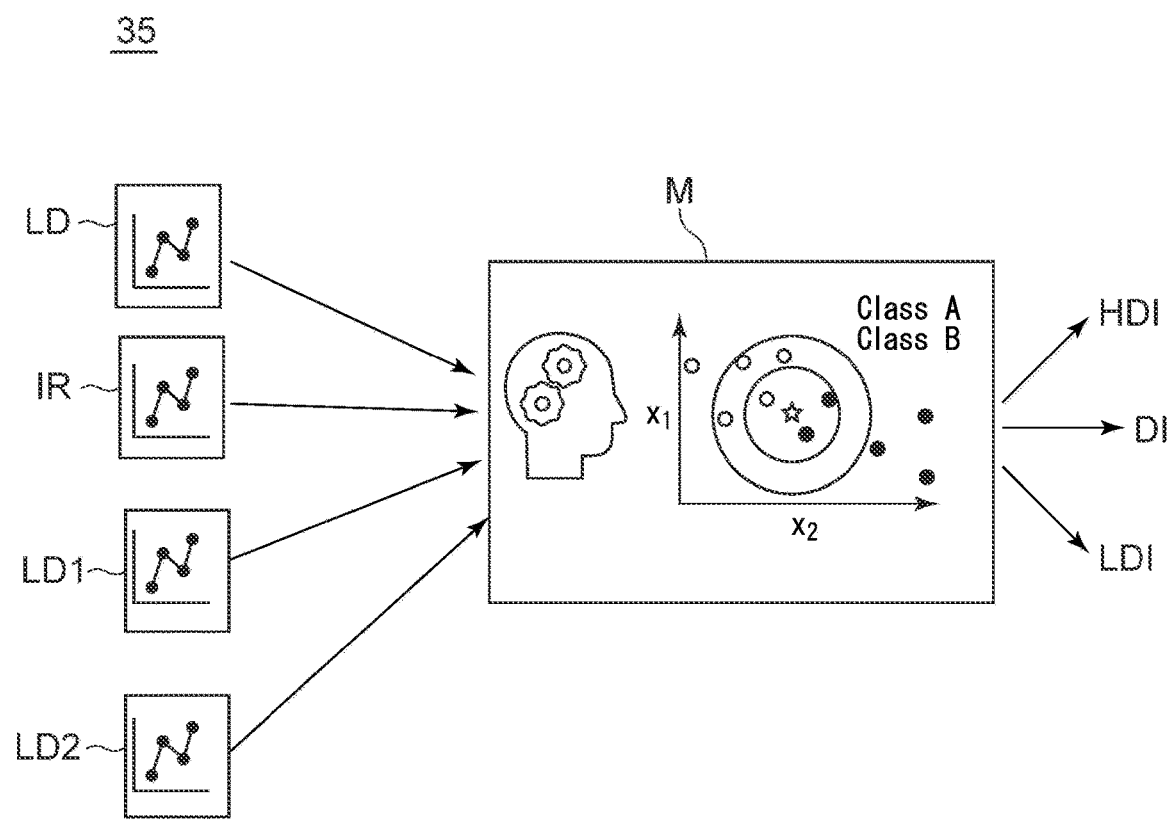
FIG. 8 is an explanatory view for describing a determination index calculation unit according to an embodiment of the present disclosure.

FIG. 8 is an explanatory view for describing the determination index calculation unit according to an embodiment of the present disclosure. In some embodiments, the above-described determination index calculation unit 35 is configured to calculate the determination index DI in consideration of the inspection result IR of the at least one device 2 stored in the server-side inspection result storage unit 33.

In the illustrated embodiment, the determination index calculation unit 35 includes an abnormality diagnosis model M (classification model) which is generated by machine learning of learning data LD for abnormality diagnosis, and the abnormality diagnosis model M uses the determination index DI as output data, as shown in FIG. 8. As the learning data LD for abnormality diagnosis, not only data of the device 2 disposed in the inspection target area 1 described above, but also data of another plant device or public failure data may be used. In this case, it is possible to generate the abnormality diagnosis model M and to output the determination index DI, even if the data of the device 2 disposed in the inspection target area 1 is insufficient as the learning data LD. For the abnormality diagnosis model M, it is possible to adopt a known machine learning model using the k-nearest neighbor algorithm, the MT method, or the like.

The determination index calculation unit 35 is configured to re-learn the abnormality diagnosis model M by using the inspection result IR of the at least one device 2 stored in the server-side inspection result storage unit 33 as additional learning data. In this case, it is possible to improve the accuracy of the determination index DI output by the abnormality diagnosis model M. In addition to the inspection result IR, the determination index calculation unit 35 may use, for example, operation data LD1 of the plant or weather data LD2 such as temperature as additional learning data.

With the above configuration, the server-side inspection result storage unit 33 can accumulate the inspection results IR of the at least one device 2 acquired in the personal digital assistant 20. The determination index calculation unit 35 calculates the determination index DI in consideration of the inspection result IR of the at least one device 2 stored in the server-side inspection result storage unit 33, whereby it is possible to improve the accuracy of the determination index DI. Thus, it is possible to improve the determination accuracy for the abnormality in the device 2 by the abnormality determination unit 222.

Figure 9:
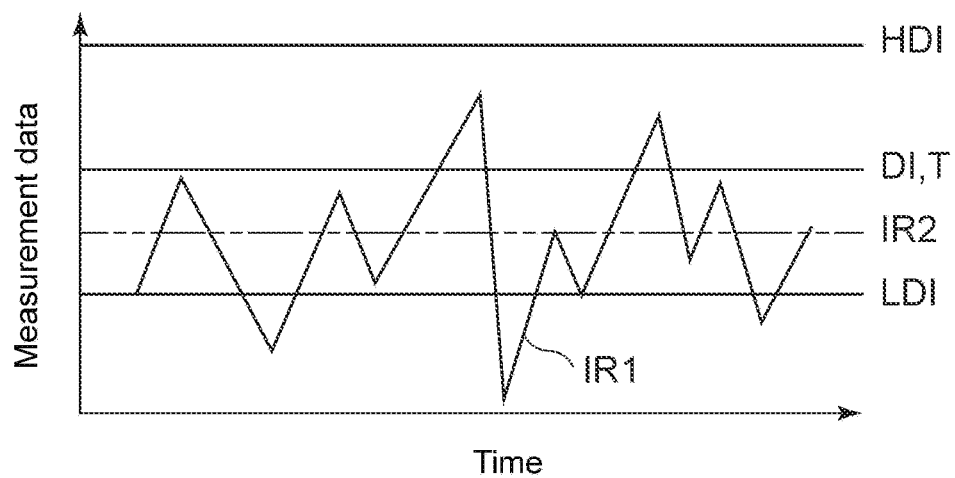
FIG. 9 is an explanatory chart for describing a method of comparing the determination index and an inspection result of a device according to an embodiment of the present disclosure.

FIG. 9 is an explanatory chart for describing a method of comparing the determination index and the inspection result of the device according to an embodiment of the present disclosure. As shown in FIG. 9, in the above-described abnormality determination unit 222, the inspection result IR of the device 2 compared with the determination index DI may be a measurement value IR1 of the wireless sensor 4 or may be a statistical value IR2 obtained by statistically processing the measurement data of the wireless sensor 4 over a prescribed time period. The statistical value IR2 is an average value, a variance value, standard deviation, or the like of the above-described measurement data. As the determination index DI in the abnormality determination unit 222, a threshold T corresponding to the inspection result IR (measurement value IR1, statistical value IR2) may be used.

In some embodiments, in addition to the determination index DI, the above-described abnormality diagnosis model M may output a sign index LDI indicating that the abnormality level of the device 2 is higher than the determination index DI or a warning index HDI indicating that the abnormality level of the device 2 is higher than the determination index DI, as shown in FIG. 9. In this case, the inspector can easily grasp the abnormality level of the device 2.

FIG. 10 is an explanatory table for describing the method of comparing the determination index and the inspection result of the device according to an embodiment of the present disclosure. As shown in FIG. 10, the above-described abnormality determination unit 222 may determine the abnormality in the device 2 by comparing the plurality of inspection results IR with the plurality of thresholds T (determination indexes DI). When the abnormality in the device 2 is determined in two types of inspection results IR different in physical quantity, matrix may be used which is represented by a matrix divided into a plurality of sections by the threshold T for each physical quantity, with one physical quantity as the row and another physical quantity as the column, as shown in FIG. 10. Multivariate analysis or the like may be used when the abnormality in the device 2 is determined in not less than three types of inspection results IR different in physical quantity.

In some embodiments, the above-described control terminal 40 includes various storage units used for information transmission between the personal digital assistant 20 and the data server 30. That is, the control terminal 40 further includes a control terminal-side guidance information storage unit 42 configured to store the above-described guidance information G, a control terminal-side inspection result storage unit 43 configured to store the above-described inspection result IR, a control terminal-side work result storage unit 44 configured to store the above-described work result WR, and a control terminal-side determination index storage unit 45 configured to store the above-described determination index DI, as shown in FIG. 1.

In some embodiments, one of the above-described response procedures RP includes work to newly install the above-described wireless sensor 4. The wireless sensor 4 is configured to acquire the status of the at least one device 2 described above and is configured to wirelessly communicate with the personal digital assistant 20.

With the above configuration, the quality and quantity of data that can be acquired from the at least one device 2 described above can be improved by newly installing the wireless sensor 4, making it possible to identify the cause of the abnormality (abnormal event AE) in the device 2 early to solve the problem. Further, data acquisition, diagnosis by the wireless sensor 4 is possible even after the abnormality in the device 2 is resolved.

The present disclosure is not limited to the above-described embodiments, and also includes an embodiment obtained by modifying the above-described embodiments and an embodiment obtained by combining these embodiments as appropriate. The above-described personal digital assistant 20, 20A, the data server 30, and the control terminal 40 may each include a calculator (microcomputer) with a processor, a memory (RAM), an auxiliary storage unit, an interface, and the like. The processing contents by each of the personal digital assistant 20, 20A, the data server 30, and the control terminal 40 may be implemented as programs executed by the processor and may be stored in the auxiliary storage unit. When executed, these programs are loaded into the memory. The processor reads out the programs from the memory to execute instructions included in the programs, respectively.

The contents described in some embodiments described above would be understood as follows, for instance.

1) A personal digital assistant (20) according to at least one embodiment of the present disclosure is a personal digital assistant (20) for supporting inspection of at least one device (2) disposed in an inspection target area (1), that includes: an abnormality acquisition unit (22) configured to acquire information about an abnormality in the at least one device (2); a guidance information storage unit (23) configured to store guidance information (G) which at least includes at least one response procedure (RP) for each abnormal event (AE) in the at least one device (2) and information about response capability (RC) required to execute the at least one response procedure (RP); and a display unit (24) configured to refer to the guidance information (G) stored in the guidance information storage unit (23), and display the guidance information (G) for responding to an abnormal device (2A) which is the device (2) where the abnormality is acquired by the abnormality acquisition unit (22).

With the above configuration 1), if the abnormality in the at least one device (abnormal device 2A) is acquired by the abnormality acquisition unit (22), the personal digital assistant (20) can display the guidance information (G) for responding to the abnormal device (2A) stored in the guidance information storage unit (23) on the display unit (24). The guidance information storage unit (23) prestores the guidance information (G) for the at least one device (2) to be inspected, before the inspector executes inspection. Thus, the personal digital assistant (20) can display the guidance information (G) for responding to the abnormal device (2A) on the display unit (24) even under the environment where the restriction is placed on information transmission by data communication or the like.

Since the guidance information (G) displayed on the display unit (24) includes the at least one response procedure (RP) for each abnormal event (AE) in the abnormal device (2A), the inspector who visually recognizes the guidance information (G) can respond in accordance with the response procedure (RP). Further, the guidance information (G) displayed on the display unit (24) includes the information about response capability (RC) required for execution of each response procedure (RP). Thus, although the response procedure (RP) that can be handled differs depending on the competence of the inspector, the inspector who visually recognizes the guidance information (G) can respond in accordance with the response procedures (RP) that can be executed by the inspector among the response procedures (RP) displayed on the display unit (24). With the guidance information (G) displayed on the display unit (24), the inspector can quickly take appropriate countermeasures against the abnormal device (2A), making it possible to shorten a time required to resolve a problem with the abnormal device (2A), and to reduce an inspection cost.

2) In some embodiments, the personal digital assistant (20) as defined in the above configuration 1) further includes a work result input unit (25) configured to allow a work result (WR) of work according to the at least one response procedure (RP) to be input.

With the above configuration 2), since the personal digital assistant (20) inputs the work result (WR) of the work according to the response procedure (RP) to the work result input unit (25), it is possible to accumulate the results of whether the abnormality (AE) in the abnormal device (2A) is resolved by the response procedure (RP).

3) In some embodiments, the personal digital assistant (20) as defined in the above configuration 2), wherein the display unit (24) is configured to display the new guidance information (G) if the work result (WR) input to the work result input unit (25) is not good.

With the above configuration 3), in case where the abnormal event (AE) in the abnormal device (2A) still cannot be resolved even if the inspector responds in accordance with the response procedure (RP) which is included in the guidance information (G) displayed on the display unit (24), the reconsidered new guidance information (G) can be displayed on the display unit (24) by inputting the work result (WR) to the work result input unit (25). In this case, the inspector can quickly respond in accordance with the response procedure (RP) included in the reconsidered new guidance information (G), making it possible to shorten the time required to resolve the problem with the abnormal device (2A), and to reduce the inspection cost.

4) In some embodiments, the personal digital assistant (20) as defined in the above configuration 2) or 3) further includes a guidance information update unit (27) configured to update the guidance information (G) in consideration of the work result (WR) input to the work result input unit (25).

With the above configuration 4), since the work result (WR) of the work according to the response procedure (RP) is input to the work result input unit (25), it is possible to accumulate the results of whether the abnormal event (AE) in the abnormal device (2A) is resolved by the response procedure (RP). Since the guidance information update unit (27) updates the guidance information (G) in consideration of the work result (WR) of the work according to the response procedure (RP), it is possible to improve the accuracy of the response procedure (RP) included in the guidance information (G). Thus, it is possible to make the response procedure (RP), which is displayed on the display unit (24) in next and subsequent inspections, more appropriate.

5) In some embodiments, the personal digital assistant (20) as defined in any one of the above configurations 1) to 4), wherein the guidance information (G) stored in the guidance information storage unit (23) further includes information about a plurality of probable causes of abnormality (EAC) associated with the abnormal event (AE) in the at least one device (2), the information being about a plurality of probable causes of abnormality (EAC) respectively having occurrence probabilities (PG) of the plurality of probable causes of abnormality (EAC), the at least one response procedure (RP) includes a plurality of response procedures (RP) respectively associated with the plurality of probable causes of abnormality (EAC), and the display unit (24) is configured to display a list of the plurality of response procedures (RP) in order of the occurrence probabilities (PG).

With the above configuration 5), the plurality of response procedures (RP) are associated with the plurality of probable causes of abnormality (EAC), respectively. If the abnormal event (AE) occurs in the device (2), it is highly likely that the cause is the probable cause of abnormality (EAC) having the high occurrence probability (PG). Thus, in a case where the inspector executes the response procedure (RP) which is associated with the probable cause of abnormality (EAC) having the high occurrence probability (PG), as compared with a case where the inspector executes the response procedure (RP) which is associated with the probable cause of abnormality (EAC) having a low occurrence probability (PG), it is highly likely that the abnormality (abnormal event AE) in the device is resolved. Since the display unit (24) of the personal digital assistant (20) displays the list of the plurality of response procedures (RP) in order of the occurrence probability (PG) of the probable cause of abnormality (EAC), it is possible to prompt the inspector who visually recognizes the display unit (24) to execute the response procedure (RP) which is associated with the probable cause of abnormality (EAC) having the high occurrence probability (PG). Thus, it is possible to shorten the time required to resolve the problem with the abnormal device (2A), and to reduce the inspection cost.

6) In some embodiments, the personal digital assistant (20) as defined in the above configuration 5) further includes: a work result input unit (25) configured to allow a work result (WR) of work according to the at least one response procedure (RP) to be input; and a guidance information update unit (27) configured to update the guidance information (G) in consideration of the work result (WR) input to the work result input unit (25). The guidance information update unit (27) is configured to update the respective occurrence probabilities (PG) of the plurality of probable causes of abnormality (EAC) in consideration of the work result (WR) input to the work result input unit (25).

With the above configuration 6), since the inspector inputs the work result (WR) of the work according to the response procedure (RP) to the work result input unit (25), it is possible to accumulate the results of whether the abnormal event (AE) in the abnormal device (2A) is resolved by the response procedure (RP). Since the guidance information update unit (27) updates the guidance information (G) in consideration of the work result (WR) of the work according to the response procedure (RP), it is possible to improve the accuracy of the occurrence probability (PG) of each of the plurality of probable causes of abnormality (EAC) included in the guidance information (G). Thus, it is possible to make the display order of the response procedures (RP), the list of which is displayed on the display unit (24) in the next and subsequent inspections, more appropriate.

7) In some embodiments, the personal digital assistant (20) as defined in any one of the above configurations 1) to 6), wherein the guidance information (G) stored in the guidance information storage unit (23) further includes at least one of an inspection history (231), a Fault Tree diagram (232), a drawing (233), or a manual (234) of the at least one device (2).

With the above configuration 7), the guidance information (G) displayed on the display unit (24) includes any of the inspection history (231), the Fault Tree diagram (232), the drawing (233), or the manual (234) of the abnormal device (2A). In this case, the inspector visually recognizes the inspection history (231), the Fault Tree diagram (232), the drawing (233), the manual (234), or the like of the abnormal device (2A) displayed on the display unit (24), allowing the inspector to take more appropriate countermeasures against the abnormal device (2A). Thus, it is possible to shorten the time required to resolve the problem with the abnormal device (2A), and to reduce the inspection cost.

8) In some embodiments, the personal digital assistant (20) as defined in any one of the above configurations 1) to 7), wherein one of the response procedures (RP) includes work to newly install a wireless sensor (4) which is configured to acquire a status of the at least one device (2) and is configured to wirelessly communicate with the personal digital assistant (20).

With the above configuration 8), the quality and quantity of data that can be acquired from the at least one device (2) described above can be improved by newly installing the wireless sensor (4), making it possible to identify the cause of the abnormal event (AE) early to solve the problem. Further, data acquisition, diagnosis by the wireless sensor (4) is possible even after the abnormal event (AE) in the device (2) is resolved.

9) In some embodiments, the personal digital assistant (20) as defined in any one of the above configurations 1) to 8), wherein the abnormality acquisition unit (22) includes: an inspection result acquisition unit (221) configured to acquire an inspection result (IR) of the at least one device (2); and an abnormality determination unit (222) configured to determine the abnormality in the at least one device (2) in consideration of the inspection result (IR) of the at least one device (2) acquired by the inspection result acquisition unit (221).

With the above configuration 9), since the personal digital assistant (20) includes the inspection result acquisition unit (221) and the abnormality determination unit (222), even under the environment where the restriction is placed on information transmission by data communication or the like, it is possible to determine the abnormality in the at least one device (2) described above, in consideration of the inspection result (IR) of the at least one device (2). If the abnormality in the at least one device (2) is determined by the abnormality determination unit (222), the personal digital assistant (20) can display the guidance information (G) for responding to the abnormal device (2A) stored in the guidance information storage unit (23) on the display unit (24). In this case, the inspector can immediately visually recognize the guidance information (G) displayed on the display unit (24) after confirming the abnormality in the device (2) in the vicinity of the device (2), making it possible to promptly take appropriate countermeasures against the abnormal device (2A).

10) An inspection support system (10) according to at least one embodiment of the present disclosure is an inspection support system (10) for supporting inspection of at least one device (2) disposed in an inspection target area (1), that includes: the personal digital assistant (20) as defined in any one of the above configurations 1) to 9); and a data server (30) configured to perform information transmission with the personal digital assistant (20), the data server (30) including a server-side guidance information storage unit (32) configured to store the guidance information (G) transmitted from the personal digital assistant (20). The personal digital assistant (20) includes: a work result input unit (25) configured to allow a work result (WR) of work according to the at least one response procedure (RP) to be input; and a guidance information update unit (27) configured to update the guidance information (G) in consideration of the work result (WR) input to the work result input unit (25).

With the above configuration 10), the guidance information (G) updated by the guidance information update unit (27) of the personal digital assistant (20) is stored in the server-side guidance information storage unit (32) of the data server (30). In this case, the guidance information (G) stored in the server-side guidance information storage unit

(32) can also be transmitted to the personal digital assistant (20A) other than the above-described personal digital assistant (20). Thus, it is possible to make use of the above-described another personal digital assistant (20A) in the work on the abnormal device (2A).

11) An inspection support system (10) according to at least one embodiment of the present disclosure is an inspection support system (10) for supporting inspection of at least one device (2) disposed in an inspection target area (1), that includes: the personal digital assistant (20) as defined in the above configuration 9); and a data server (30) configured to perform information transmission with the personal digital assistant (20), the data server (30) at least including a determination index calculation unit (35) configured to calculate a determination index (DI) for determining whether the at least one device (2) is abnormal. The personal digital assistant (20) further includes a determination index storage unit (29) configured to store the determination index (DI) calculated by the determination index calculation unit (35). The abnormality determination unit (222) is configured to determine the abnormality in the at least one device (2) by comparing the determination index (DI) stored in the determination index storage unit (29) with the inspection result (IR) of the at least one device (2) acquired by the inspection result acquisition unit (221).

With the above configuration 11), the determination index (DI) is calculated in advance by the determination index calculation unit (35) of the data server (30), is transmitted to the personal digital assistant (20), and is stored in the determination index storage unit (29). The abnormality determination unit (222) of the personal digital assistant (20) can determine the abnormality in the at least one device (2) by comparing the determination index (DI) stored in the determination index storage unit (29) with the inspection result (IR) of the at least one device (2) acquired by the inspection result acquisition unit (221). In this case, the personal digital assistant (20) need not perform processing with a high computational load such as calculation of the determination index (DI), allowing even the personal digital assistant (20) with low computational resources to accurately determine the abnormality in the device (2). Further, the personal digital assistant (20) can promptly determine the abnormal device (2A) even under the environment where the restriction is placed on information transmission by data communication or the like.

12) In some embodiments, the inspection support system (10) as defined in the above configuration 11), wherein the data server (30) further includes a server-side inspection result storage unit (33) configured to store an inspection result (IR) of the at least one device (2) transmitted from the personal digital assistant (20), and the determination index calculation unit (35) is configured to calculate the determination index (DI) in consideration of the inspection result (IR) of the at least one device (2) stored in the server-side inspection result storage unit (33).

With the above configuration 12), it is possible to accumulate, in the server-side inspection result storage unit (33), the inspection results (IR) of the at least one device (2) acquired in the personal digital assistant (20). Since the determination index calculation unit (35) calculates the determination index (DI) in consideration of the inspection result (IR) of the at least one device (2) stored in the server-side inspection result storage unit (33), it is possible to improve the accuracy of the determination index (DI). Thus, it is possible to improve the determination accuracy for the abnormality in the device (2) by the abnormality determination unit (222).

The invention claimed is:

1. An inspection support system for supporting inspection of at least one device disposed in an inspection target area, comprising:
 a personal digital assistant comprising:
  an inspection result acquisition unit configured to acquire an inspection result of the at least one device;
  an abnormality determination unit configured to determine the abnormality in the at least one device in consideration of the inspection result of the at least one device acquired by the inspection result acquisition unit;
  a guidance information storage device configured to store guidance information which at least includes at least one response procedure for each abnormal event in the at least one device and information about response capability required to execute the at least one response procedure; and
  a display configured to refer to the guidance information stored in the guidance information storage device, and display the guidance information for responding to an abnormal device which is the device where the abnormality is acquired by the abnormality acquisition unit; and
 a data server configured to perform information transmission with the personal digital assistant, the data server at least including a determination index calculation unit configured to calculate a determination index for determining whether the at least one device is abnormal,
 wherein the personal digital assistant further includes a determination index storage unit configured to store the determination index calculated by the determination index calculation device, and
 wherein the abnormality determination unit is configured to determine the abnormality in the at least one device by comparing the determination index stored in the determination index storage device with the inspection result of the at least one device acquired by the inspection result acquisition unit.

2. The inspection support system according to claim 1, wherein the personal digital assistant further comprising:
 a work result input unit configured to allow a work result of work according to the at least one response procedure to be input.

3. The inspection support system according to claim 2, wherein the display is configured to display the new guidance information if the work result input to the work result input unit is not good.

4. The inspection support system according to claim 2, wherein the personal digital assistant further comprising:
 a guidance information update unit configured to update the guidance information in consideration of the work result input to the work result input unit.

5. The inspection support system according to claim 1, wherein the guidance information stored in the guidance information storage device further includes information about a plurality of probable causes of abnormality associated with the abnormal event in the at least one device, the information being about a plurality of probable causes of abnormality respectively having occurrence probabilities of the plurality of probable causes of abnormality,
 wherein the at least one response procedure includes a plurality of response procedures respectively associated with the plurality of probable causes of abnormality, and wherein the display is configured to display a list of the plurality of response procedures in order of the occurrence probabilities.

6. The inspection support system according to claim 5, wherein the personal digital assistant further comprising:
a work result input unit configured to allow a work result of work according to the at least one response procedure to be input; and
a guidance information update unit configured to update the guidance information in consideration of the work result input to the work result input unit,
wherein the guidance information update unit is configured to update the respective occurrence probabilities of the plurality of probable causes of abnormality in consideration of the work result input to the work result input unit.

7. The inspection support system according to claim 1, wherein the guidance information stored in the guidance information storage device further includes at least one of an inspection history, a Fault Tree diagram, a drawing, or a manual of the at least one device.

8. The inspection support system according to claim 1, wherein one of the response procedures includes work to newly install a wireless sensor which is configured to acquire a status of the at least one device and is configured to wirelessly communicate with the personal digital assistant.

9. The inspection support system according to claim 1, wherein the data server further includes a server-side guidance information storage device configured to store the guidance information transmitted from the personal digital assistant,
wherein the personal digital assistant includes:
a work result input unit configured to allow a work result of work according to the at least one response procedure to be input; and
a guidance information update unit configured to update the guidance information in consideration of the work result input to the work result input unit.

10. The inspection support system according to claim 1, wherein the data server further includes a server-side inspection result storage device configured to store an inspection result of the at least one device transmitted from the personal digital assistant, and
wherein the determination index calculation unit is configured to calculate the determination index in consideration of the inspection result of the at least one device stored in the server-side inspection result storage device.

11. A personal digital assistant for supporting inspection of at least one device disposed in an inspection target area, comprising:
an abnormality acquisition unit configured to acquire information about an abnormality in the at least one device;
a guidance information storage device configured to store guidance information which at least includes at least one response procedure for each abnormal event in the at least one device and information about response capability required to execute the at least one response procedure;
a display configured to refer to the guidance information stored in the guidance information storage device, and display the guidance information for responding to an abnormal device which is the device where the abnormality is acquired by the abnormality acquisition unit;
wherein the guidance information stored in the guidance information storage device further includes information about a plurality of probable causes of abnormality associated with the abnormal event in the at least one device, the information being about a plurality of probable causes of abnormality respectively having occurrence probabilities of the plurality of probable causes of abnormality,
wherein the at least one response procedure includes a plurality of response procedures respectively associated with the plurality of probable causes of abnormality,
wherein the display is configured to display a list of the plurality of response procedures in order of the occurrence probabilities,
wherein the personal digital assistant further comprising:
a work result input unit configured to allow a work result of work according to the at least one response procedure to be input; and
a guidance information update unit configured to update the guidance information in consideration of the work result input to the work result input unit,
wherein the guidance information update unit is configured to update the respective occurrence probabilities of the plurality of probable causes of abnormality in consideration of the work result input to the work result input unit.

* * * * *